(12) United States Patent
Müller et al.

(10) Patent No.: US 8,044,947 B2
(45) Date of Patent: Oct. 25, 2011

(54) METHOD TO TRANSMIT A CODED INFORMATION AND DEVICE THEREFORE

(75) Inventors: Lorenz Müller, Biel (CH); Marcel Jacomet, Lengnau (CH); Roger Cattin-Liebl, Grenchen (CH); Alain Rollier, Steinen (CH)

(73) Assignee: AXSionics AG (CH)

( * ) Notice: Subject to any disclaimer, the term of this patent is extended or adjusted under 35 U.S.C. 154(b) by 1075 days.

(21) Appl. No.: 11/603,959

(22) Filed: Nov. 22, 2006

(65) Prior Publication Data
US 2007/0133839 A1    Jun. 14, 2007

(30) Foreign Application Priority Data

Nov. 22, 2005 (EP) .................................. 05405651

(51) Int. Cl.
*G09G 5/00* (2006.01)
(52) U.S. Cl. ........ 345/207; 345/204; 345/169; 345/605; 713/165; 713/176; 713/183
(58) Field of Classification Search .................. 345/169, 345/204, 207, 405; 235/494, 462.09, 462.1; 382/232; 713/165, 176, 183
See application file for complete search history.

(56) References Cited

U.S. PATENT DOCUMENTS

| | | | | |
|---|---|---|---|---|
| 4,599,489 A | * | 7/1986 | Cargile | 705/52 |
| 4,609,777 A | * | 9/1986 | Cargile | 713/184 |
| 5,237,316 A | * | 8/1993 | Cox et al. | 345/605 |
| 5,367,572 A | * | 11/1994 | Weiss | 713/184 |
| 5,432,851 A | * | 7/1995 | Scheidt et al. | 713/184 |
| 5,461,239 A | * | 10/1995 | Atherton | 250/566 |
| 5,804,809 A | * | 9/1998 | Eastman et al. | 235/462.42 |
| 5,978,656 A | | 11/1999 | Farine et al. | |
| 5,988,506 A | | 11/1999 | Schaham et al. | |
| 6,122,042 A | * | 9/2000 | Wunderman et al. | 356/73 |
| 7,167,562 B2 | * | 1/2007 | Milgram | 380/256 |
| 2002/0195495 A1 | | 12/2002 | Melick et al. | |
| 2003/0189099 A1 | | 10/2003 | Carlson et al. | |
| 2005/0001032 A1 | | 1/2005 | Kim | |

FOREIGN PATENT DOCUMENTS

| | | |
|---|---|---|
| EP | 0 252 663 | 1/1988 |
| EP | 1 255 178 | 11/2002 |
| EP | 1 480 107 | 11/2004 |
| FR | 2838592 | 10/2003 |
| WO | WO 87/03977 | 7/1987 |
| WO | WO 02/01793 | 1/2002 |
| WO | 2004006456 A1 | 1/2004 |
| WO | WO 2005/020036 | 3/2005 |
| WO | WO 2005/039171 | 4/2005 |

* cited by examiner

*Primary Examiner* — Quan-Zhen Wang
*Assistant Examiner* — Jennifer T Nguyen
(74) *Attorney, Agent, or Firm* — The Webb Law Firm

(57) ABSTRACT

A method for transmitting a coded information to a user via a graphical display. The method comprises the step of obtaining coded information by a scanner, which has to be positioned near the graphical display. The coded information is transmitted to a number of code points that are arranged in the direction of the fast refresh rate of the display.

13 Claims, 4 Drawing Sheets

METHOD TO TRANSMIT A CODED INFORMATION AND DEVICE THEREFORE

FIELD OF THE INVENTION

The invention relates to a method to transmit a coded information to a user via a graphical display, comprising the step of obtaining said coded information by a scanner to be positioned near the graphical display, and a device therefore.

PRIOR ART

Such a method is known from WO 2005/039171 disclosing a method of verifying the authenticity of an image represented on a display. For that purpose a scanner is used. The scanner scans parts of the image and a unique code will be generated. This unique code will be compared, if the result is positive, the authenticity of the image is verified.

A first drawback of a method according to this document is, that the image is static and the scanner device has to be moved over the screen. It is a further drawback of this invention, that the system is limited to a certain resolution of the screen. As soon as it is used with an other screen with an other resolution or the screen resolution is changed by the user, it may not be possible to use the system.

Furthermore a linear scanner with a great number of photosensitive elements has to be used, which have to be presented in a region indicated on the display by two essentially vertical marks.

Said known method is only reliable, identifying a static barcode like image line.

WO 02/01793 discloses a 2-field transmission system for electronic signatures. The reduction to two fields with one synchronisation field solves the problem of the screen resolution, but it causes unacceptable transmission times to a computer system.

U.S. Pat. No. 5,432,851 discloses further system for secure optical transmission. As in some prior art as mentioned before it is not possible to apply the system in two different screen resolutions. Furthermore this system uses only one transmission field and works only with a CRT type screen display. The same restriction holds for the invention disclosed in U.S. Pat. No. 5,978,656.

EP 1255178 discloses a further system for a use of optical interfaces for the authentication of persons. In EP1480107A2 protocols are presented that allow secure challenge-response authentication with the availability of only a one-way fully encrypted and thus protected communication channel.

WO 2005/020036 discloses a system, where the user identifies himself to a computer system by means of portable access device. However to successfully use this device, biometric data has to be scanned.

Furthermore there are optical interfaces know from prior art, such as U.S. Pat. No. 4,609,777 or WO 87/03977. It is a disadvantage that the said system is not applicable for the different screen resolutions as well as for codes that are much longer than 4 bits as the invention relies on a defined space-time pattern. This kind of control access to local computer hardware is not possible in highly distributed communication systems like the Internet.

Authentication means for computer users are well know by prior art and it is possible to chose from a plethora of means for such a purpose. It is in the interest of network users, especially internet users, and network operators, such as banks, insurance companies etc. that the authentication procedure to gain access to the computer system is reliable and secure and that no unauthorized person gains access to the network. In addition most organizations wish that the roll-out and the management of such access systems should be possible without any local hardware or software installations at the access terminal.

Known authentication systems give access to the user if they are able to provide a user name, password and third authentication means. The third authentication means usually provides a code by algorithmic means that is unique.

SUMMARY OF THE INVENTION

It is an object of the present invention to provide a method to generate an authentication code with the aid of a graphical code and with a scanner in order to authenticate a user at a computer network. It is a further object that this system is not limited by the changing resolution and/or refresh rate and/or display technology (CRT, TFT, LCD etc) of different computer or handheld device monitors. The disclosed method allows transmitting strongly encrypted codes with key length up to 1024 or 2048 bits in ergonomically acceptable time slots of a few seconds over any kind of graphical computer displays.

According to the invention there is provided a method to transmit a coded information to a user via a graphical display. Said coded information is obtained by a scanner to be positioned near the graphical display. The coded information is transmitted through a number of code points. Said code points are arranged in the direction of the fast refresh rate of the display.

According to the invention there is provided a system for securely transmitting coded information to a user via a graphical display. The system comprises a display device for representing the coded information and a scanning device for scanning the coded information and a computer for processing the coded information.

Further preferred embodiments of the method are designated by the depended claims.

The invention in question addresses the problem of scaling and image refreshment. The change of width of the optical field to be scanned, wherein the optical points to be scanned always have the same relative width in relation to its neighbours, ensures that at least at one point in height the geometry of the sensor array matches the length of the optical field. The arrangements of the sensors on the scanning device guarantee that the device reads always the complete image pattern even when patterns change nearly at the refreshment frequency of the display. No synchronization between the display refreshment and the pattern flickering frequency is necessary.

4 to 30 sensors can be used within a practical length of 10 centimeters of such a device, preferably around maximum 10 sensors.

Preferably the synchronisation signal for the scanning device is included within the coding.

The arrangement of the optical fields, i.e. pixels, is provided in a row being oriented parallel to the direction within which the screen is refreshed in a fast way in comparison to the slow refreshment time of subsequent lines.

The device itself is designed in an ergonomic way. The geometry of the device is ergonomic since it can be held in an easy way against the screen ensuring a good reading of the optical information displayed on said screen.

Preferably the device comprises an internal display to inform the user about the status and the next step to perform.

Vertical or slightly tilted guiding lines provided in the optitical field as well as on the device itself improve the easy horizontal (height) and vertical positioning of the device.

Horizontal lines are provided in the optical field help with the horizontal (angular) positioning of the device.

Preferably the screen output comprises adjusting buttons to scale the optical field directly in discrete or quasi continuous steps.

All features strive to improve a method to transmit a coded information to a user via a graphical display in a way that this connection can be regarded as a relative high-bandwidth optical interface, especially to transmit coded messages.

Such a channel can be used
- for authentication within a challenge-response protocol or for a one-time password,
- to transmit a secret message, e.g. instructions to open a new channel to avoid and circumvent a man-in-the-middle attack,
- to generate a signed transaction code by and for both sides,
- to generate a personal licence,
- to transmit a message to a smartcard connected to the device,
- to transmit messages and codes to the device for its configuration, to name a couple of possible applications.

The method ensures that said flickering fields are provided in a way to ensure that a number of at least three geometrical fields (at least within one pixel row) are controlled which are covered and therefore detected by a corresponding number of sensor elements, and this independently from the resolution of the screen.

One possible embodiment shows a trapezoid form for every field. This proposal allows a greater number of sensor elements and thus a faster code transmission.

It is also possible that a quasi-continuous sensor array is provided, especially a sensor element with hundreds of sensor elements. It has only to be guaranteed that the number of field elements represented by the screen is reaching a number, which is at most the number of sensor elements used by the card 20, allowing a 1:1 representation of the code.

BRIEF DESCRIPTION OF THE DRAWINGS

The drawings will be explained in greater detail by means of a description of an exemplary embodiment, with reference to the following figures.

DETAILED OF THE PREFERRED EMBODIMENTS

Figure 1:
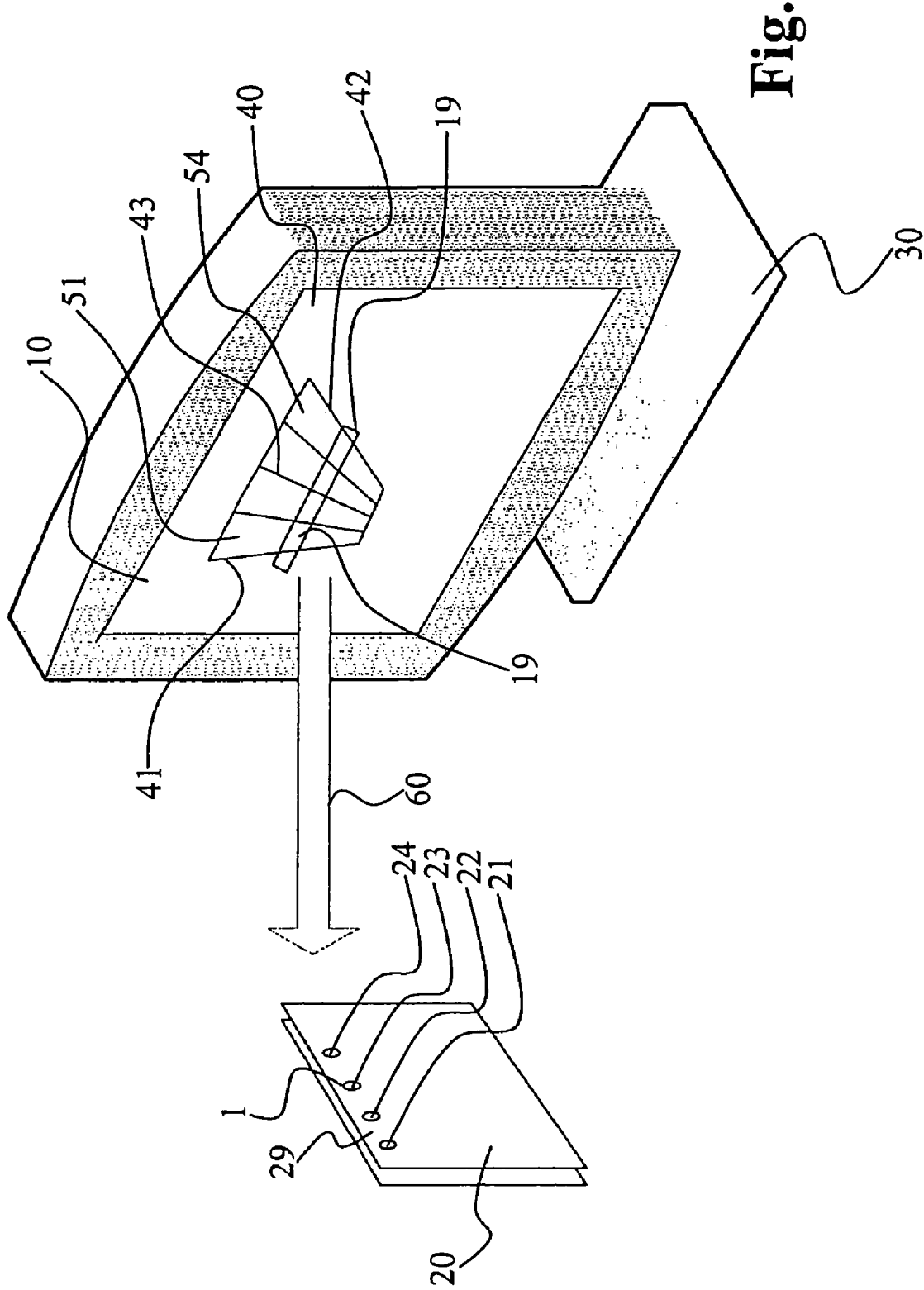
FIG. 1 a schematic representation of a system for user authentication according to the invention, FIG. 2 a part of the screen display for user authentication, FIG. 3 a scanner device which can be used in connection with the method according to the invention, and FIG. 4 a cross-section of the scanner device of FIG. 3.

FIG. 1 shows a schematic representation of a system for user authentication according to the invention, comprising a display 10 and an authentication module 20. The display 10 is usually connected as a computer monitor to a computer system 30 but it could also be integrated in service automation device or in a hand-held device. The control unit generating the image on the display 10 can be said computer system 30 or said computer system 30 receives control information for generating said display from a remote station. The arrow 60 indicates the one-way transmission channel to transmit a relative long plain or cypher text message, e.g. 1 to 2 kbit, directly into the device 20.

Figure 2:
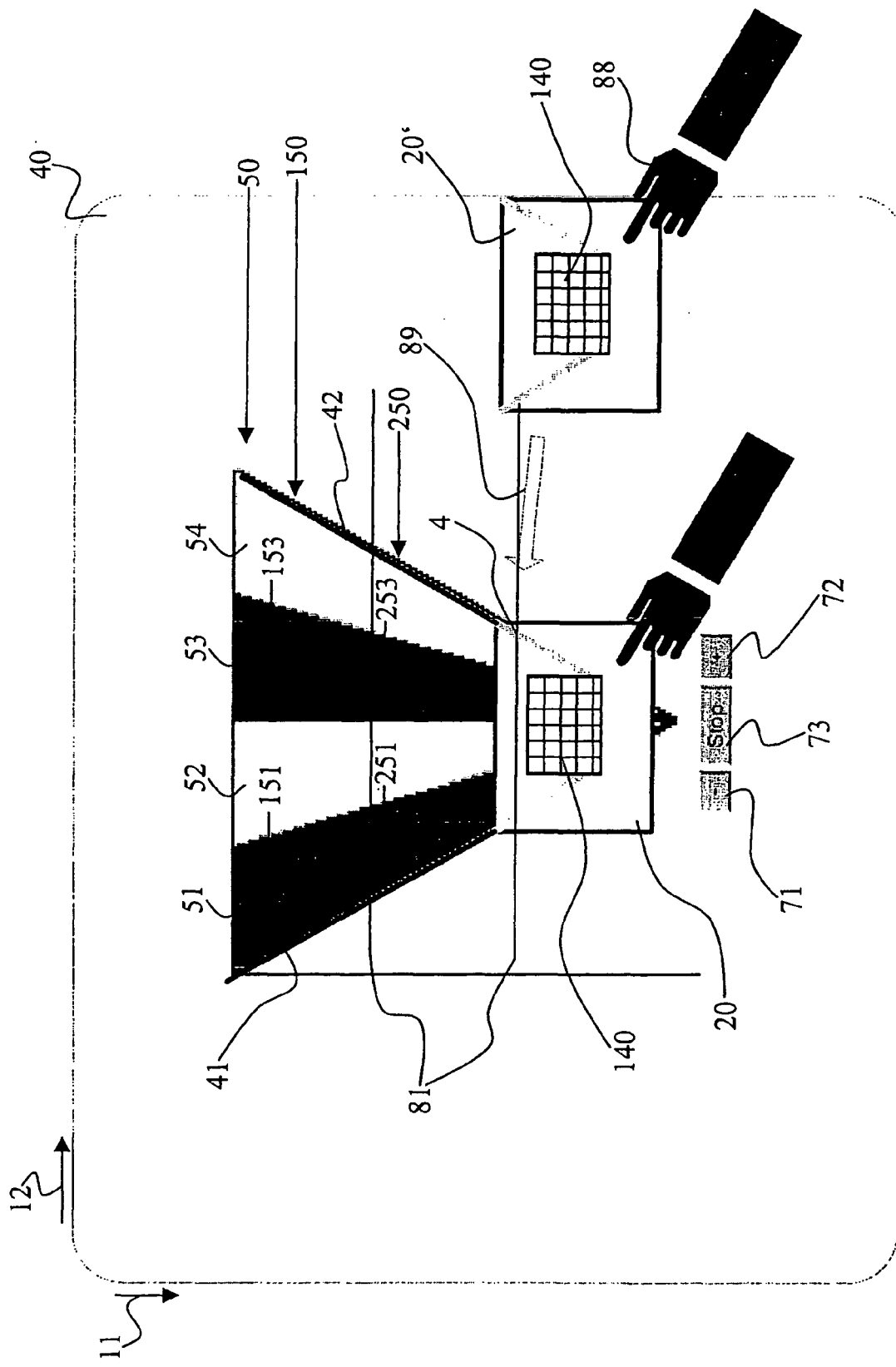

The computer monitor 10 may be a cathode ray tube (CRT) monitor or a liquid crystal display (TFT, LCD) or any other type (Plasma, PLED etc.). Such computer monitors 10 have a display surface 40, e.g. a glass screen. A part of the screen display surface 40 for user authentication is shown in FIG. 2. Such a monitor 10 has different refresh rates in horizontal as well as in vertical direction for building up the image on the screen. The vertical direction, which has a refresh rate between 50 and 100 Hz, is indicated by arrow 11 and also designated as slow refresh direction. The horizontal direction, which has a refresh rate between 30-96 kHz, is indicated by arrow 12 and also designated as fast refresh direction.

The computer monitor 10 according to the present invention displays a number of code points, code fields or code strips 51, 52, 53, 54 on at least one horizontal virtual guide line 50. A virtual guide line is at least one line of pixel 51, 52, 53, 54 represented by one vertical step in FIG. 2. Such steps are unavoidable in view of the technology of current screen displays. Each point 51, 52, 53, 54 usually comprises a number of pixels, e.g. two to a few tenth of pixels, in the horizontal direction, on at least one row (said row 50) in the vertical direction. The embodiment shows four code points 51 to 54 and the corresponding scanner 20 as shown in FIG. 1 has four sensitive elements 21 to 24. It will be clear for someone skilled in the art, that the invention will work for a number of code points 51 starting with three and can be applied to scanners 20 with ten, twenty or more sensitive elements. Thirty sensitive elements will be a practical upper limit. The device 20 in FIG. 3 has eight sensor elements 21 to 24 and 24' to 21'. Additionally there might be a second row of sensor elements 121, shown in shaded representation.

It is also possible to arrange all sensor points 21, 22 etc. one beside and adjacent one another without leaving any dead detection zones 29 on the device 20. The distances between each two sensor points 21 and 22, 22 and 23 etc. may be equal or different. It is clear that the code points 51 to 54 have to be adapted to these prerequisites. In any case, it is possible to make the code points bigger in the horizontal direction, so that they are direct or mostly direct neighbours.

The user who wants to gain access to a computer network has to be equipped with usual identification means, such as a user name and/or a contract number and/or a password, and a scanner 20, which has to be used in connection with the computer display 10 in order to scan the graphical code.

Said code is then decoded to receive the information from the host computer. Said information may comprise a single password phrase to be entered to the computer console related to monitor 10, but can also comprise an information payload to be distributed in a different manner, i.e. through RFID transmittal, sonic transmission etc. The computer network to be accessed may be a website of a bank, where the user gains access to its account details, an online shop, where the user has an account for orders etc., an intranet within a company, a door where authentication is required, etc. . The summary of the invention mentions further useful applications.

After or before entering the usual identification data such as username or password via the keyboard, the user needs to scan the graphical code, which is displayed on the screen. The code points 51 to 54 are emitting a fast changing coded signal which is catched by the detector elements 21, 22, 23, 24, arranged at one edge of the scanning device 20. The code points 51 to 54 are separated one from another as are the detector elements 21 to 24. The code—for every point pair 21/51 to 24/54—can be a greyscale code, a colour code a simple black-and-white detection. As a generic term the wording flickering code is used within this description to describe the view which is experienced by a user. The advantage to read the code along one horizontal line 50, i.e. parallel to the fast refreshment direction of the monitor 12, allows to transmit a high bandwidth information, even with a limited number of point pairs 21/51 etc. The alignment of the scanning device with the fast refreshment direction avoids the problem of the synchronization of the generation of the flickering code with the refreshment cycle of the display and thus the flickering code may be generated within an encapsulated programming environment that has no access to control parameters of the local operating system. This allows to transfer relative long plain or cipher text in a minimal time window to any peripheral terminal device using so called Web technologies or any other transmission technology.

The screen display 40 shows two tapered guiding lines 41 and 42, mostly oriented in the slow direction 11. These lines 41 and 42 can constitute the external boundaries for applying the scanner 20, i.e. the external edges 28 of the scanner 20, or some mark on the frontside or backside of the scanner 20.

In view of the facts that the resolution of the screen might be small or large and the dimensions of the different screens to be used are usually quite different the one line 50 with its number of code points 51 to 54 will usually not match the sensor elements 21 to 24. Below the first named line of code points 51 to 54, there are provided a number of additional horizontal code points (e.g. points 121). The invention is based on the insight that additional horizontal lines as 150 or 250 provide for a different, smaller distance between the code points 251 to 254. Code points with a similar reference numeral (51, 151, 251) are controlled with the same code and display with at most a small delay the same information. It is also possible to create a code point line over corresponding code points 51 over 151 to 251. This creates a code line essentially "similar" in the mathematical sense to the guiding line 41.

It has to be noted that the tapered line 41 is in fact a stepwise arranged line due to the digital nature of the display. It is also contemplated that the guiding lines 41, 42 comprise steps visible to the user or comprise a curved taper. It is also possible that the tapered line 41 is opening to the upper end and have the smaller distances between the points 51 to 54 in the lower region of the display 40.

Lines 41 and 42 are a valuable guiding aid for the user. The user has to place the scanner 20 in a manner that the scanner 20 is in horizontal direction (along direction 12) and that the edges 28 of the scanner 20 are congruent with the line arrangement 41 and 42. There might also be a single e.g. middle line 43 as shown in FIG. 1.

The sensor elements 21 to 24 of the scanner 20 are then positioned in a correct manner over the code points 51 to 54. The scanner 20 then scans the graphical code over some time and displays e.g. an authentication code to be submitted or signals the correct reception of a coded information. In the case of an authentication the dataset, which now comprises the usual identification data and the authentication code, will be processed. The user will be authenticated if the datasets are verified.

A position of the scanner 20 to read the graphical code is shown in FIG. 1 as a rectangle 19, covering several neighbouring lines. The rectangle 19 can comprise a part surface, of surface 86 comprising all sensor elements and intervening space 29.

The graphical code is an arrangement of code points 51 to 54 in dots. The dots provide at least a binary code and may be arranged in different shapes. In a first arrangement (not shown in the Figs.) the code points are arranged in one single line 50, which lies in the fast refresh direction. Preferably the line 50 comprise at least three code points. In a second arrangement, shown in FIGS. 1 and 2, a larger number of discrete lines, comprising at least three lines 50, 150, 250 marked with reference numerals, are arranged parallel one to another. This allows the user to always position the scanning device at the line with the right scaling to match the sensors with exactly the right flickering point.

The graphical code may be realised through a fast displaying of changing images (GIF, JPEG, animated GIF etc.) or displaying the code via an image generating program, such as a Java applet. Furthermore it is possible to generate image by a local program, which displays the image data on the screen (Flash, JavaScript). The code may be modulated by black/white images, greyscales or colours.

The sequence of images, which provides the flickering, contains a redundant information in order to identify or reconstruct lost or poorly transmitted images. An error correction code may be used. Additionally a coding is used to distinguish the subsequent transmittal of two identical codes. The internal synchronization between the flickering code on the display and the reading scanning device is built in the coded signal. There is no need to use one of the signal points just for synchronization information. This allows to use the maximal bandwidth of the flickering channel for useful information.

Figure 3:
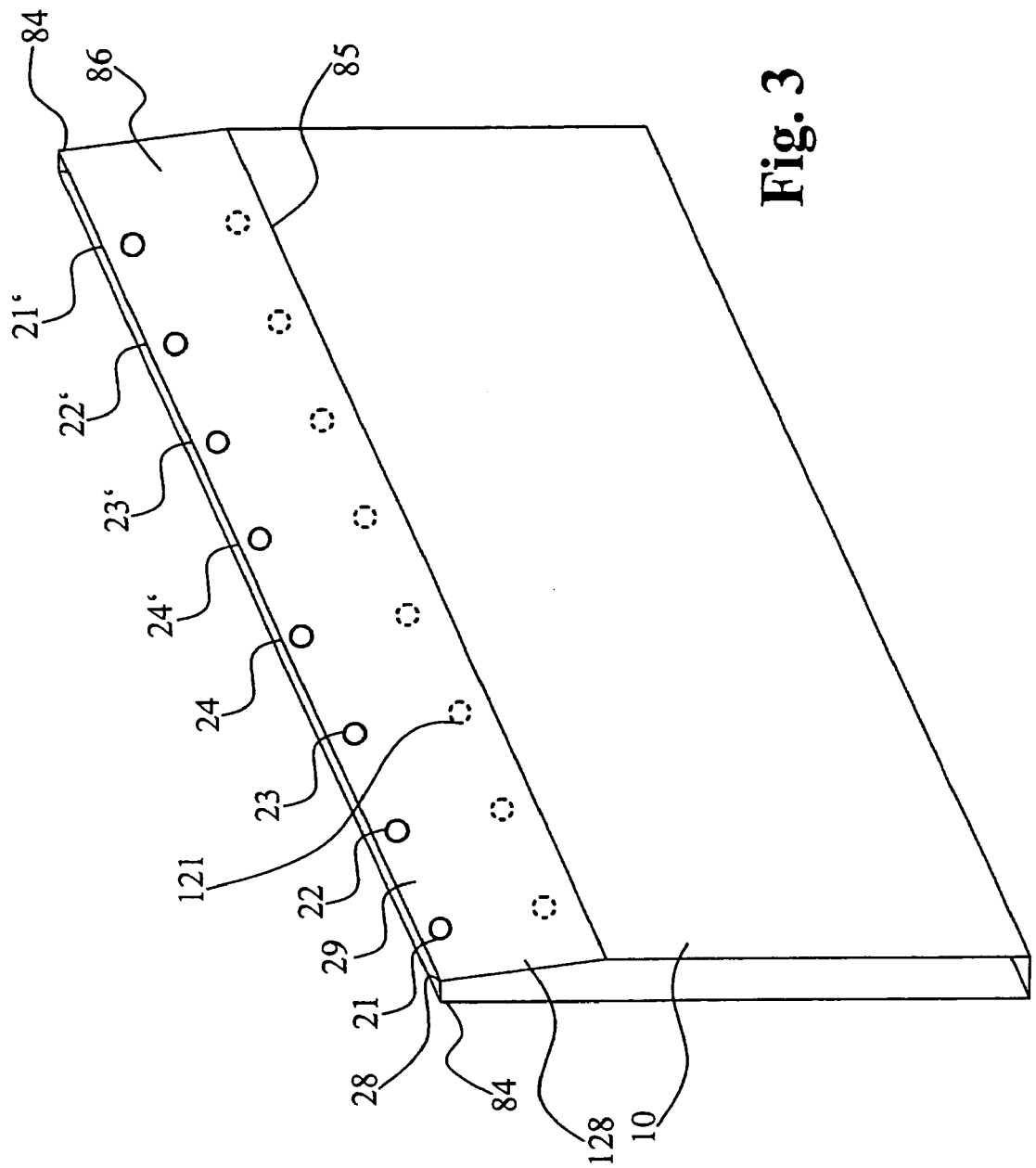

FIG. 3 shows the scanner 20, also designated as token, having eight optical sensors 21, 22, 23, 24, 24', 23', 22' and 21' that are arranged preferably in a line. It is also possible to arrange several lines, a second line with such sensors 121 is shown in a shadowed representation. The arrangement of the optical sensors may also be designated as array or sensor array. The scanner 20 has to be able to scan the graphical code, therefore the distance between the code points of the graphical code and the distance between the sensors has preferably to be equal. The distance between two adjacent code points can be different, one pair from another, this makes the code representation asymmetric.

Since the sensors 21 to 24, 24' to 21' are arranged in a fixed manner, the distance between the code points has to be chosen accordingly. The distance between the code points depend on the resolution of the monitor, therefore the distance between the code points vary according to the resolution of the monitor. To solve that problem several graphical codes are arranged, in order to provide several set of code points with different distances between the code points.

The optical sensors may be chosen from the group of photosensors, phototransistors or micro-cameras. However it is possible to use any other suitable sensor means. Furthermore it is possible to realise the photosensor with a photo transistor with a low pass filter for reduction of high-frequency noise (e.g. noise generated by artificial light bulbs).

It is also possible that the scanner, as mentioned above, may have its optical sensors behind a cylindrical aperture, which limits the amount of light to a small cone. This allows to place the sensor in a dense way since crosstalk would be prevented. The apertures may not only be built as described but also as an array of small holes in the housing of the sensor array.

In order to prevent that dust and dirt to contaminate the optical elements, such as lenses and sensors etc., and disturb the reading process, it is a possibility to provide a structure that is similar to a lens.

Furthermore it is possible that the optical system is arranged in the edge 128 of a card 20, which has similar dimensions as a credit card. This card 20 is also designated as a smart card. It is also possible to integrate the optical system in a further token. This enables the user to hold the card or the token in a user-friendly manner to the screen. This card or token can be easily carried around by the user, for example in a container for smartcards. The edge 128 comprising the sensor elements may be inclined to the front and back surface of the card 20 for easier manipulation. However, it is also possible to provide the sensor elements in the upper very narrow edge 28 of the card 20.

It is a further feature of the scanner 20 that it is equipped with at least a light emitting diode, which shows the status, e.g. correct/incorrect, of the data transmission, preferably a screen 140 as shown in FIG. 2.

Figure 4:
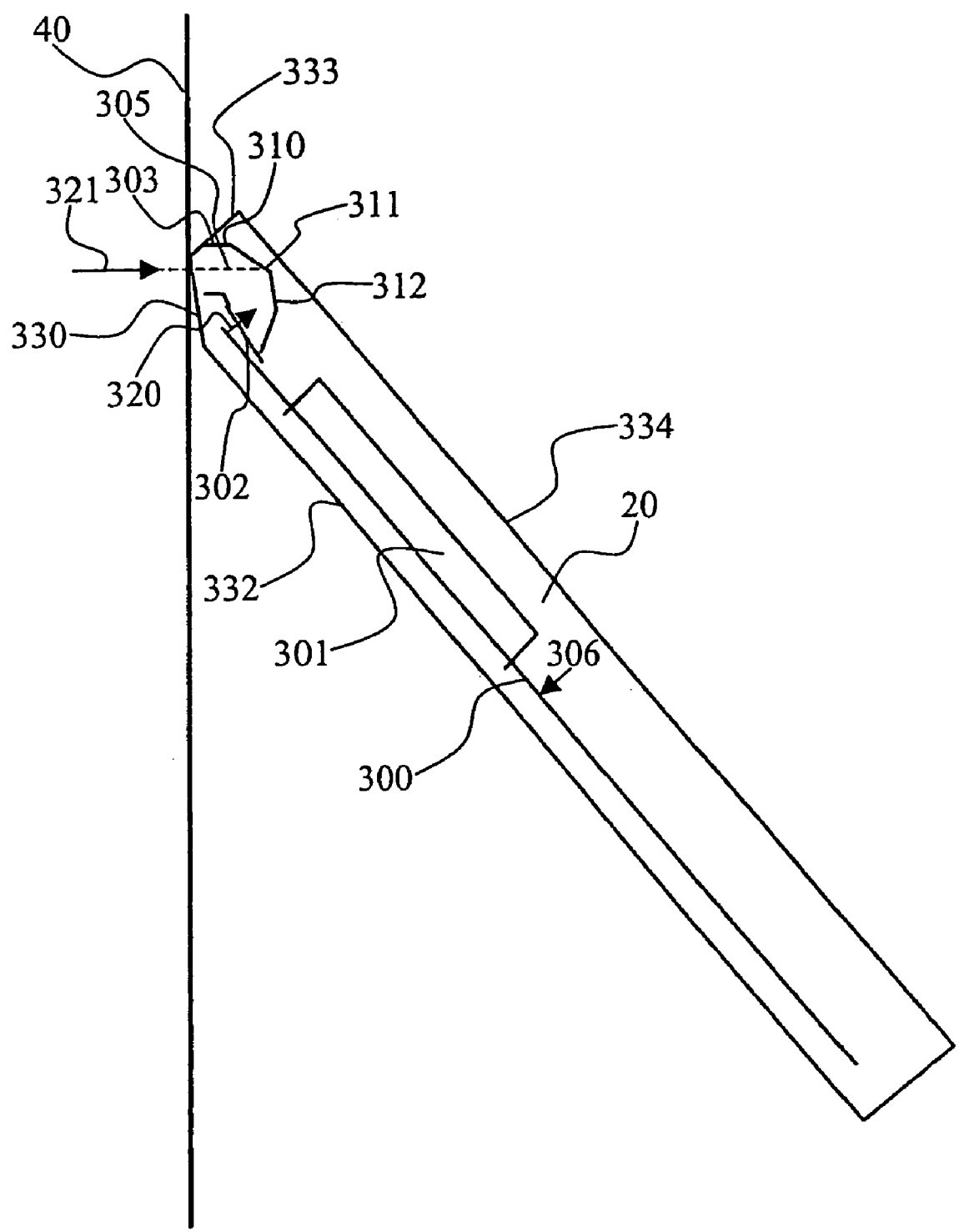

FIG. 4 shows a cross-section of the scanner device 20 of FIG. 3. The optical sensor 302 is thereby arranged on a printed circuit board 300. Its optical sensitivity is orthogonal to the printed circuit board 300, as indicated by arrow 320. Various electronic devices 301 such as integrated circuit chips and the like for controlling the scanner device 20 are solely arranged on an upper surface 306 of the printed circuit board 300 as the optical sensor 302. Also on the upper surface 306 there is an optical deflection element 303, arranged in order to deflect a light signal from an emitting direction 321 to the direction of the optical sensitivity of the optical sensor 302 in a direction anti-parallel to the arrow 320. The light signal is the signal that represents the coded information and is emitted by the computer screen 40 as described.

The optical deflection element 303 is preferably made out of an optical material that has preferably a high refractive index, e.g. an index over 1.3 and preferably of about 1.4, i.e. the element 303 is mainly full material and fits on the printed circuit board 300. The edges 310, 311, 312 of the optical deflection element are arranged (in relation to the above-mentioned refractive index) in specific angles in order to provide an optical arrangement with total reflection for all entering light with a direction according or similar to arrow 321. The path of the light signal is illustrated by a dashed line 305.

However, it is understood that the optical deflection element 303 may also be made out of a metallic foil having the exterior outline as the edges 310, 311 and 312 of the deflection element 303 and being affixed to the body of the scanner device 20. It is advantageous that the usual smart-card like form of the device 20 comprises an inclined front window or opening 330 to allow the light to enter the device and/or the optical deflection element 303. The front opening 330 max form an angle of 45 degree in relation to the bottom 332 of the smart-card 20 as well as an angle of 45 degree in relation to the upper edge 333.

The optical deflection element 303 allows to affix all electronic circuits on one side (side 306) of the printed circuit 300, without losing the flexibility of the smart-card 20, i.e. the display, as e.g. the element 301, to be read through the top 334 of the smart-card 20, and nevertheless to have a good reading /scanning ability in the direction of the window 330, nearly opposite to the front side of the printed circuit, i.e. in an angle of between 120 and 150 degree seen from the direction 320 of the optical scanner 302, preferably around 135 degree.

When the deflection element (303) is made of an reflective sheet element, said e.g. metallic foil is arranged—in the cross-section view—along a polygon or curve to reflect an incoming optical signal 321 towards said sensor 302 having its sensitivity orthogonal to the printed circuit board 300.

In a first embodiment according to the present invention, shown in FIG. 2, the screen display two guide lines, a left line 41 and a right line 42, which are straight lines. The left line 41 and the right line 42 comprise the same length and mirror themselves on a middle line 43, which is in vertical direction. The left line and the right line are arranged angular to the horizontal direction. The angle α may be between 45° and 135°. Therefore the left line 41 and the right line 42 are tapered to each other. The graphical code is centered between the left line 41 and the right line 43. In order to adapt the method to different monitor resolutions, several graphical codes are displayed on different lines 50, 150, 250. The smaller the horizontal distance between the left line 41 and the right line 42, the smaller is the distance between the code points 51 to 52 or 151 to 152 or 251 to 252.

In a different embodiment the right line and the left line are substituted with a curve. The curve may be semicircular, a segment of a circle or comprise various segments of a circle with various diameters. Both ends of the curve may be on a virtual line, which is in horizontal direction and not shown on the screen. The graphical code is arranged in the same manner as in the first embodiment.

In a further embodiment the right line and the left line comprise horizontal and vertical portions alternately. Therefore both curves have a stair-like shape. However the main direction is similar to the straight lines as described above. This is indicated by a virtual line (not shown by the screen). The graphical code is arranged in the same manner as in the first embodiment. The steps of such a representation comprise directly visible horizontal guide lines as small sections of lines 81 in FIG. 2.

Some of the current computer monitors are pivotable. The displayed image of the computer program also rotates. However the refresh rates of the former horizontal and vertical direction remain due to the design of the computer monitor. Therefore the graphical code and the guiding lines remain in the same angular position as described above. The code point arrangement is still located in the fast refresh direction. The scanner has to be held accordingly.

Preferably the display 40 also comprises horizontal guide lines 81; two of them are shown in FIG. 2.

FIG. 2 furthermore shows two representations of the device 20. Device 20' is shown to be held by a user, indicated through its hand. The user 88 sees the flickering representation between the guide lines 41, 42, 81 on the screen 40 and moves the card 20, according to arrow 89, near or onto the screen 40. He has to hold the device—more or less—horizontally, guided by the horizontal guidelines 81.

He then moves the device 20 up and down until the vertical guide lines 41 and 42 match with the upper corners 84 of the device 20. It is possible that additional orientation lines are printed on the back of the device 20, so that they can be used as additional guidelines by the user; they can be oriented horizontally or mark the corners or different near-corner calibrating points of the device 20. Such a horizontal line 85 is also generated by the edge between the flat front surface and the inclined surface 86 having the sensor elements 21 to 24 and 24' to 21'.

Additionally, especially to adapt the representation to small-sized laptops and bigger office screens, it is possible that the representation comprises adjustment buttons 72 and 71 to increase or decrease the dimensions (in pixel) of the flickering representation. It is also possible to make this process of increase or decrease a quasi-continuous one, which was to be stopped after triggering the process by using buttons 71 and 72 through pushing a stop button 73.

The invention claimed is:

1. A method to transmit a coded information to a user via a graphical display, wherein the graphical display comprises a plurality of pixels arranged in an array, wherein lines of said array are arranged in the direction of the fast refresh rate of the display, the method comprising obtaining said coded information by a scanner to be positioned near the graphical display in the direction of the fast refresh rate of the display, wherein at least two code strips are provided along said lines, each code strip comprising a number of at least three code points, wherein each code point comprises between two and a few tenth of said pixels defining the length of each code point along its line, wherein said coded information is transmitted through each code strip comprising said number of said at least three code points, wherein the length of corresponding code points on the second or any subsequent code strip is smaller than the length of corresponding code points of the first or corresponding subsequent code strip in the direction of the fast refresh rate of the display.

2. The method according to claim 1, wherein the coded information is generated by using code points that change colour or intensity.

3. The method according to claim 2, wherein the coded information is being generated by using code points that change at a frequency, which is close or equal to the physical refresh rate of the display.

4. The method according to claim 1, wherein the scanner is a linear scanner, which has at least three optical sensor points arranged in a line.

5. The method according to claim 1, wherein the code points provide a binary code.

6. The method according to claim 1, wherein corresponding code points of different code strips are either adjacent to another or not adjacent one to another, wherein each code strip is either arranged near one or between two guidelines, said guidelines being essentially oriented in the direction of the slow scan rate of the display and inclined between 45 and 0 degrees to said direction of the slow scan rate.

7. The method according to claim 6, wherein two guidelines are formed by two straight or step-wise arranged lines, which are arranged in a tapered manner.

8. The method according to claim 6, wherein the guideline is formed by a curve, which is semicircular or a segment of a circle or comprises various segments of a circle with various diameters.

9. The method according to claim 6, wherein at least one horizontal guideline essentially oriented in the direction of the fast refresh rate of the display is provided.

10. The method according to claim 6, wherein the representation of code points and guidelines can be scaled by using adjustment buttons displayed on the display.

11. The method according to claim 1, characterized in that a line with a plurality of code points is displayed on the display and that the scanner is used comprising a plurality of sensor points, wherein the number of code points is smaller or at most equals the number of sensor points of the scanner.

12. A system for securely transmitting a coded information to a user via a graphical display, the system comprising a computer for processing said coded information, a scanning device being a linear scanner, wherein the linear scanner has at least three sensor points arranged in a line near an edge of the device, for scanning said coded information, a display device comprising a plurality of pixels arranged in an array, wherein lines of said array are arranged in the direction of the fast refresh rate of the display, for representing said coded information according to a method comprising obtaining said coded information by a scanner to be positioned near the graphical display in the direction of the fast refresh rate of the display, wherein at least two code strips are provided along said lines, each code strip comprising a number of at least three code points, wherein each code point comprises between two and a few tenth of said pixels defining the length of each code point along its line, wherein said coded information is transmitted through each code strip comprising said number of said at least three code points, wherein the length of corresponding code points on the second or any subsequent code strip, if any, is smaller than the length of corresponding code points of the first or corresponding subsequent code strip in the direction of the fast refresh rate of the display.

13. A method to transmit coded information to a user via a graphical display, wherein the graphical display comprises a plurality of pixels arranged in an array, wherein lines of said array are arranged in the direction of the fast refresh rate of the display, the method comprising obtaining said coded information by a scanner to be positioned near the graphical display in the direction of the fast refresh rate of the display, wherein at least two code strips are provided along said lines, each code strip comprising a number of at least three code points, wherein each code point comprises between two and a few tenth of said pixels defining the length of each code point along its line, wherein said coded information is transmitted through each code strip comprising said number of said at least three code points, wherein the number of pixels forming the corresponding code points on the second or any subsequent code strip is smaller than the length of the number of pixels forming the corresponding code points of the first or corresponding subsequent code strip in the direction of the fast refresh rate of the display.

* * * * *